(12) United States Patent
Ebinger

(10) Patent No.: US 7,511,234 B1
(45) Date of Patent: Mar. 31, 2009

(54) AUTOMATED WASTE SCALING SYSTEM AND METHOD OF WEIGHING AND DOCUMENTING WASTE DATA

(76) Inventor: George E. Ebinger, 3414 Peachtree Rd., Suite 1060, Atlanta, GA (US) 30326

( * ) Notice: Subject to any disclaimer, the term of this patent is extended or adjusted under 35 U.S.C. 154(b) by 323 days.

(21) Appl. No.: 11/395,895

(22) Filed: Mar. 31, 2006

Related U.S. Application Data

(60) Provisional application No. 60/667,152, filed on Mar. 31, 2005.

(51) Int. Cl.
*G01G 19/00* (2006.01)
(52) U.S. Cl. .................. 177/132; 177/133; 177/134
(58) Field of Classification Search ......... 177/132–135; 700/305
See application file for complete search history.

(56) References Cited

U.S. PATENT DOCUMENTS

| | | | | |
|---|---|---|---|---|
| 3,472,329 | A | * | 10/1969 | Smith ..................... 177/211 |
| 3,955,636 | A | | 5/1976 | Askew |
| 4,203,497 | A | * | 5/1980 | Harris et al. ............. 177/134 |
| 4,280,576 | A | * | 7/1981 | Smith, Jr. ................ 177/126 |
| 4,579,272 | A | | 4/1986 | McClure |
| 4,605,083 | A | | 8/1986 | Wales et al. |
| 4,992,775 | A | * | 2/1991 | Castle et al. ............. 340/525 |
| 5,086,856 | A | * | 2/1992 | Haggstrom ............... 177/161 |
| 5,366,033 | A | | 11/1994 | Koivisto |
| 5,814,771 | A | | 9/1998 | Oakes et al. |
| 5,973,274 | A | * | 10/1999 | Zarchy .................... 177/132 |
| 6,125,856 | A | | 10/2000 | Yamashita |
| 6,177,638 | B1 | * | 1/2001 | Murray .................... 177/133 |
| 6,448,898 | B1 | * | 9/2002 | Kasik ...................... 340/686.1 |
| 6,646,210 | B1 | | 11/2003 | Wissing |
| 6,703,569 | B2 | * | 3/2004 | Moore et al. ............. 177/136 |
| 6,717,072 | B1 | * | 4/2004 | Winterberg et al. ...... 177/126 |
| 6,919,516 | B2 | * | 7/2005 | Frye et al. ............... 177/25.13 |
| 7,381,910 | B1 | * | 6/2008 | Wilkerson et al. ........ 177/144 |
| 2005/0038572 | A1 | * | 2/2005 | Krupowicz ............... 700/305 |

* cited by examiner

*Primary Examiner*—Randy W Gibson

(57) ABSTRACT

An automated waste scaling system and method of weighing and documenting waste data is disclosed. A waste container box is rolled onto an approach ramp of a scaling pod to place each box caster wheel on a weighing area plate. A shear beam load cell beneath each weighing area plate provides a weight reading to a summing box, which combines weight readings to provide total weight. Total weight and other data, such as date and time of weight measurement, can be sent either by hard wiring or wireless technology to a display, printing, or electronic or digital storage device. Overload stops or check rods prevent load cells from being overloaded by weight in excess of load cell capacity. In a three-point scaling system, weight from two box rear wheel casters resting on weighing area plates and a box guide rail resting on a compression pad is combined for total weight.

2 Claims, 11 Drawing Sheets

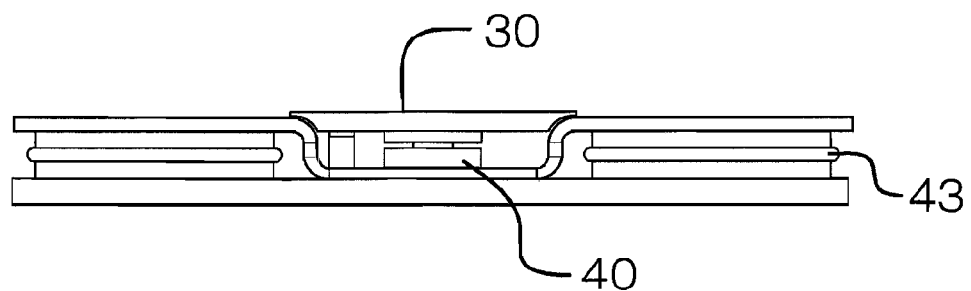
FIG. 10
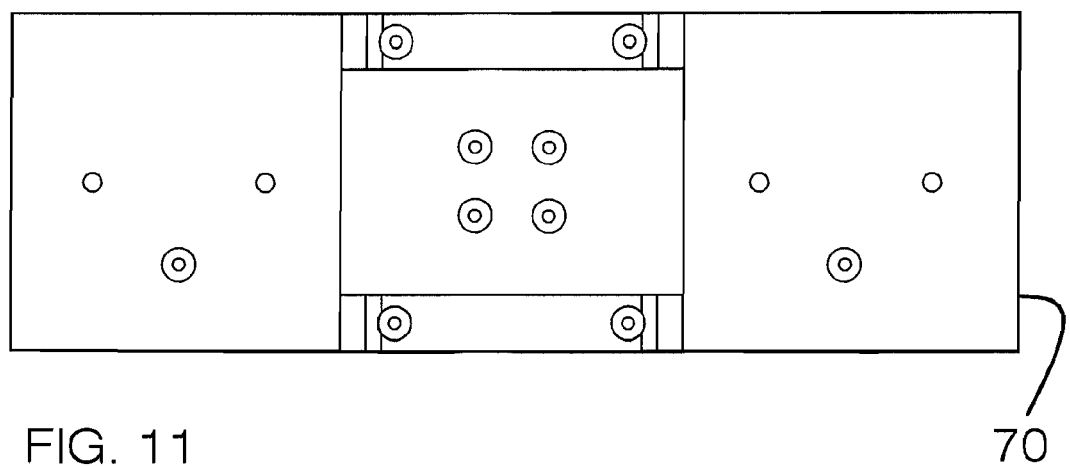
FIG. 11                                                              70

AUTOMATED WASTE SCALING SYSTEM AND METHOD OF WEIGHING AND DOCUMENTING WASTE DATA

FIELD OF INVENTION

This invention relates to load weighing systems and, more particularly, to a scale system for weighing waste container boxes and a method of weighing and documenting waste data.

BACKGROUND OF THE INVENTION

A variety of load weighing systems are known in the art. On-board truck load weighing systems using hydraulic load sensors or air pressure sensors connected to the suspension system between the frame of a truck and a load platform or cargo container of a truck and to a dial pressure indicator are previously known, but are considered to be highly inaccurate. On-board beam-type load weighing systems using beam-type load cells mounted between a truck frame and load platform or cargo container of the vehicle with strain gauges mounted on the load cells and connected to electrical monitoring equipment have also been previously provided. While the beam-type system increased the accuracy and dependability of on-board load weighing systems, calibration to determine the weight was time-consuming and required an experienced and skilled operator to perform the calibration. In addition, electrical cables had to be run from the cab of the truck to each load cell on the truck and trailer to measure the weight. Such electrical cables increased the complexity of the system and were prone to physical damage in the harsh environments in which trucks operated. Long lengths of electrical cable were prone to signal loss and induced electrical noise creasing inaccuracies in weight measurements. Improvements to on-board load weighing systems have been provided. However, all of these systems have a number of shortfalls in addition to those discussed heretofore. For example, many on-board transmitters can only handle a limited number of load cells per transmitter and are not easily expanded or reconfigured to account for the use of additional load cells. Also, if a truck-trailer arrangement is altered to replace or add a trailer, the entire load weight system must be reconfigured and recalibrated. The on-board systems are designed to weigh loads when being carried by a truck-trailer system and do not weigh waste at its original source, such as in a waste container box.

Photodetectors connected to a microprocessor controlled circuit have also been provided to compute the volume of an article and the weight of such article. However, such photodetector-microprocessor weighing devices are typically used in a packaging process and are not designed to calculate the aggregate weight of a large number of articles contained in a large waste container box. A review of prior art reveals that a highly accurate, sturdy, and versatile device is needed to weigh items contained in a large-capacity container box, such as a dumpster or roll off container.

SUMMARY OF THE INVENTION

The present device allows a user to accurately a high-capacity waste container box, such as a dumpster or roll off container, used in construction, demolition, recycling, and refuse operations. Said scaling system generally one or more scaling pods each further comprising an approach ramp; a plurality of side guards; a scale base; a weighing area plate; a plurality of side plate; a wheel gap; a plurality of load cell; a plurality of overload stop; at least two back stop; a plurality of side plate; a summing box; and a display device and printing device. The present scaling system comprises ramp-style scaling pods formed of steel or aluminum. Welded steel construction is generally used for durability of the invention. Each scaling pod contains shear beam load cells. Each load cell accommodates at least a ten thousand pound (10,000 lb.) load and may accommodate a twenty thousand pound (20,000 lb. load). Load cells are hermetically sealed to ensure proper operation in humid weather environments. Each load cell may be powered by electricity, solar power, or by other conventional power sources. Each load cell is connected to a summing box. The scale system takes weight readings from each of the load cells which, in turn, are sent to a summing box. The summing box is formed of high polish stainless steel to ensure durability in harsh weather conditions. Watertight nylon compression fittings are typically used to construct the summing box. The summing box combines the weight readings from each scaling pod load cell to calculate a total container box weight and sends data regarding total weight of a container box to data storage or printing devices, such as an LCD display. Storage and printing devices are constructed so as to ensure moisture resistance and harsh weather conditions. For example, such items may be sprayed with silicone protective coating or otherwise enclosed in a moisture-resistant container. Data may be transmitted via connective wiring, radio waves, WI-Fi transmission, Blue Tooth compatible transmission or the like. The date and time of weight measurement and weight of the waste container box, along with other related information including, but not limited to, name of the person taking the weight measurement, the waste hauler, and the like, may be also stored electronically and printed.

The scaling pods may be used to weigh a variety of waste container boxes. The scaling pods may be used to weigh commercially available waste container boxes or may be used to hold specifically designed waste container boxes. The scaling pods are used by rolling the waste container box onto scaling pods located at each corner of such waste container box or below each wheel of a waste container. Thus, the present scaling system may require the use of an appropriate number of scaling pods to suit the waste container box. Such scaling pods can be used as a portable device or installed in a permanent location. The present automated waste scaling system may be used with all styles of waste box casters or pads. The scaling pods are heavy duty and large enough for fixed station waste box drops. The load profile of the system is designed to maintain the stability of waste container boxes. The scaling pods are formed of steel and are highly durable. In addition, the load cells are capable of handling sudden impact or high weight gains. The weight of such waste container box is computed by a summing box and is displayed on an LCD display or other display device and data, such as date and time of the weight computation and weight, is printed via a printer or other output device attached to the LCD display or other display device. The present automated waste scaling system provides for wired or wireless communications directly to any formatted software accounting or cash register systems. The device calculates the weight of items within a high-capacity waste container box within ten (10) pounds plus or minus of the actual weight. The high accuracy of the present system increases savings on a user's waste collection bills. An advantage of the present scaling system is that is may be used to weight waste container box loads exceeding the current legal road weight limit for waste haulers. Thus, the scaling system provides total weight readings to users: 1) to regulate the amount of waste the user generates; 2) to determine the amount of waste hauls from the waste hauler to a landfill; 3) to double-check the waste hauler's calculation of the amount of waste contained in a waste container box and the hauler's charge for hauling the waste; 4) to determine if the amount of waste contained in a waste container box exceeds the legal road weight limit for waste haulers prior to waste hauling; and 5) to keep a record of the weight of a waste container box and the date and time of the weight measurement.

The present invention may be used as a three-point waste scaling system. The three-point waste scaling system employs two scaling pods upon which two back wheel casters of a waste container box rest and a compression pad upon which a guide rail of a waste container box rests. Weight readings from by each scaling pod and compression pad 70 are sent via wiring to a summing box. The summing box combines or adds together weight measured by each scaling pod and compression pad to provide a total or aggregate weight of said waste container box.

Use of the present automated waste scaling system may also allow a user to earn environmental credits through State and Federal environmental programs. The system disclosed herein can also be beneficial for recycling programs due to its accuracy and its ability to accommodate a wide variety of container boxes. The present invention can also useful in rebate programs wherein a contractor is given credit for returning construction items by weight to a construction supply business.

In addition to weighing waste, the present invention may be used to weigh vehicles and gas tankers.

The present invention is affordable when compared to current highway weighing systems for truck loads.

Certain aspects of the present automated waste scaling system overcome one or more drawbacks of the previous art and/or advance the state-of-the-art of load-weighing devices and, in addition, may meet one or more of the objects as stated hereinbelow.

Thus has been outlined, rather broadly, the more important features of an automated waste scaling system and method of weighing and documenting waste data in order that the detailed description thereof that follows may be better understood and in order that the present contribution to the art may be better appreciated. There are, of course, additional features of the present automated waste scaling system and method of weighing and documenting waste data which will be described hereinafter.

Numerous objects, features and advantages of the invention will be readily apparent to those of ordinary skill in the art upon reading the following detailed description of presently preferred, but nonetheless illustrative, examples of the invention when taken in conjunction with the accompanying drawings. In this respect, before explaining the current examples of the invention in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of the structures, methods and systems for carrying out the several purposes of the invention. It is therefore important that the description be regarded as including such equivalent constructions insofar as they do not depart from the spirit and scope of the present invention.

An object of this invention is to provide automated waste scaling system and method of weighing and documenting waste data which has all of the advantages of the prior art and none of the disadvantages.

An object of the present automated waste scaling system and method of weighing and documenting waste data is to provide a device which is capable of accurately calculating the weight of a waste container box or the aggregate weight of waste items contained in a waste container box.

Another object of this invention is to provide a device which is capable of accurately calculating the aggregate weight of a waste container box or the aggregate weight of waste items contained in a variety of waste container boxes.

It is yet another object to provide an automated waste scaling system which may be used with all styles of waste box casters or pads.

Another object of the present invention is to provide an automated waste scaling system wherein the scaling pods and compression pad are heavy duty and large enough for fixed station waste box drops.

Another object of the present invention is to provide a scaling system which may be portable or permanently installed.

Even another object of the present invention is to provide an automated waste scaling system designed to maintain the stability of waste container boxes.

Yet another object of the present automated waste scaling system is to provide highly durable scaling pods.

Another object of the present invention is to provide a scaling system which may be used to weigh waste container box loads exceeding the current legal road weight limit for waste haulers.

Still another object of the present invention is to provide total weight either a waste container box or the total weight of waste contained within waste container box loads to assist a user in the regulation the amount of waste such user generates.

Even another object of the present scaling system is to allow a user to determine the amount of waste hauls from the waste hauler to a landfill.

In addition, an object of the present scaling system is to allow a user to double-check a waste hauler's calculation of the amount of waste contained in a waste container box and the hauler's charge for hauling such waste.

Yet another object of the present scaling system is to allow a user to determine if a waste container box exceeds the legal road weight limit for waste haulers prior to waste hauling.

The provision of an automated waste scaling system capable of handling sudden impact or high weight gains is yet another object of the present invention.

The provision of a scaling system designed with an approach ramp making it easy for drivers to deposit a waste container box on scaling pods or a combination of scaling pods and a compression pad is yet another object of the present invention.

Still another object of the present invention is the provision of an automated waste scaling system wherein the weight of a waste container box is calculated and displayed on an LCD display or other display device and data, such as date and time of the weight computation and weight, is printed via a printer or other output device attached to the LCD display or other display device.

It is another object of the present automated waste scaling system to provide data regarding the waste contained in a waste container box via wired or wireless communications directly to any formatted software accounting or cash register systems.

An additional object of the present invention is to provide high accurate calculations of the weight of waste contained within a waste container box in order to increase savings on waste collection bills.

A further object of the present automated waste scaling system is to provide way to earn environmental credits through State and Federal environmental programs.

An added object of the present invention is to be beneficial in recycling programs due to its accuracy and its ability to accommodate a wide variety of container boxes.

Another object of the present invention is to be useful in rebate programs wherein a contractor is given credit for returning construction items by weight to a construction supply business.

Still even a further object of the present scaling system to provide a device for weighing not only waste contained in waste container boxes, but also vehicles and gas tankers.

Providing an affordable device for weighing waste contained in waste container boxes is yet another object of the present scaling system.

Other objects, features, and advantages of the present invention will become more readily apparent from the following detailed description of the preferred embodiment when considered with the attached drawings.

BRIEF DESCRIPTION OF THE DRAWINGS

Figure 1:
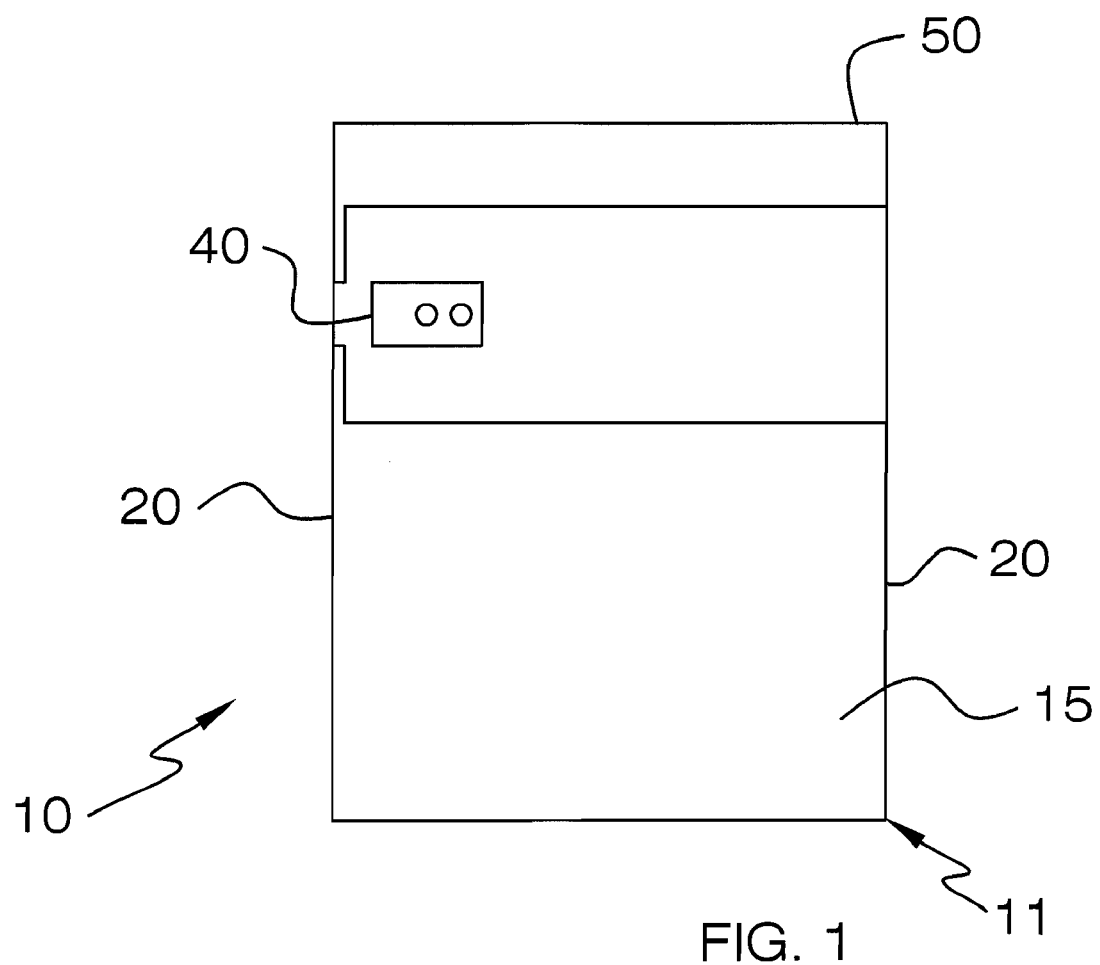
Figure 2:
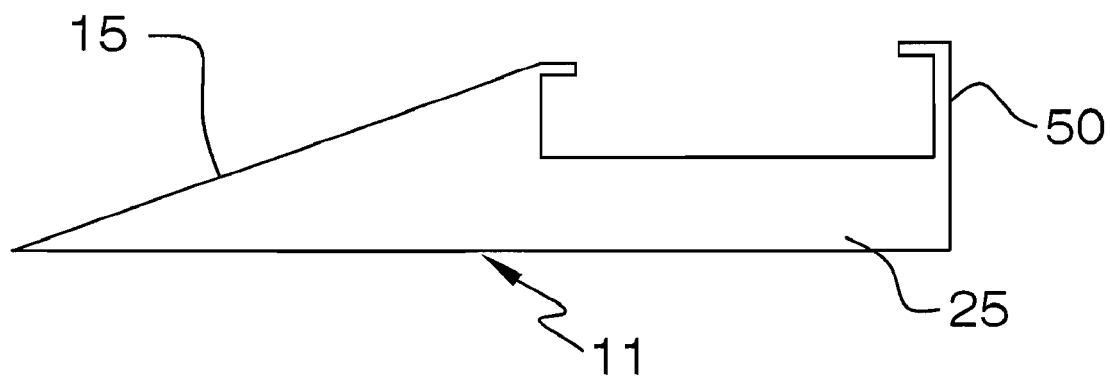
Figure 3:
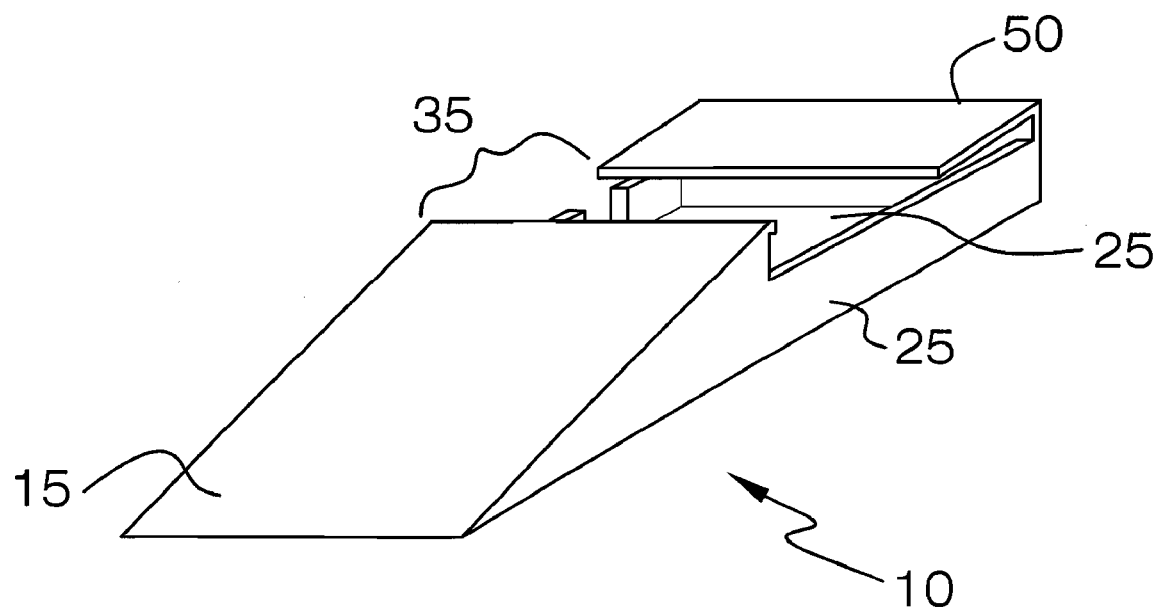
Figure 4:
Figure 5:
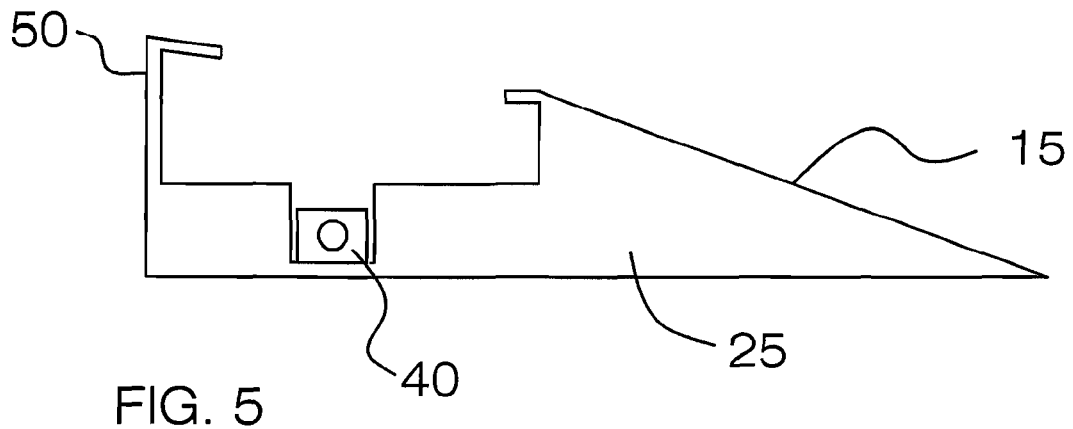
Figure 6:
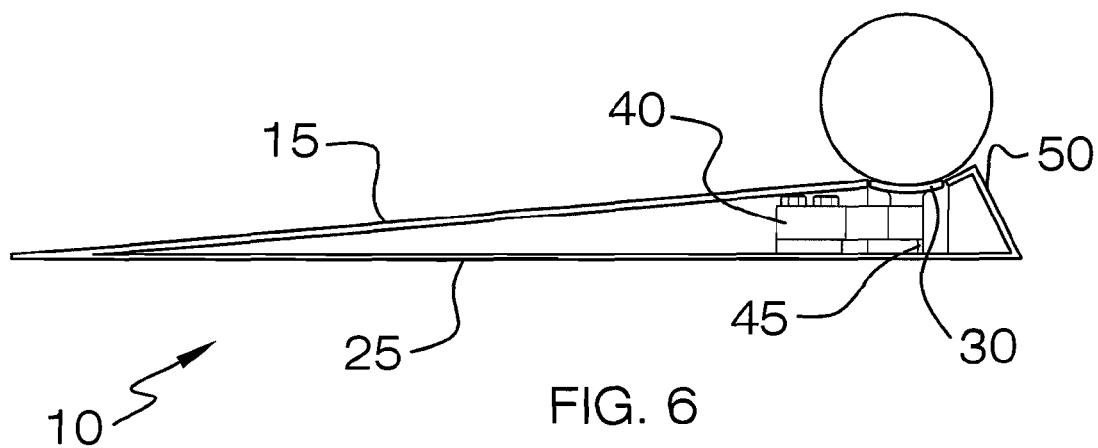
Figure 7:
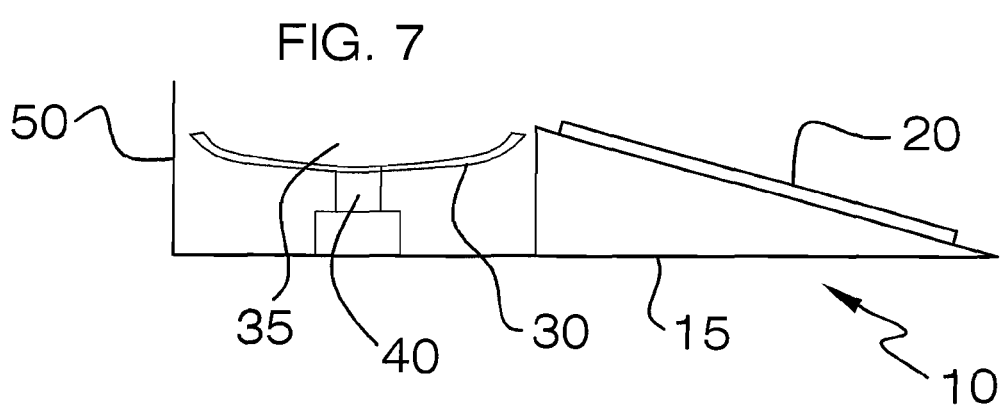
Figure 8:
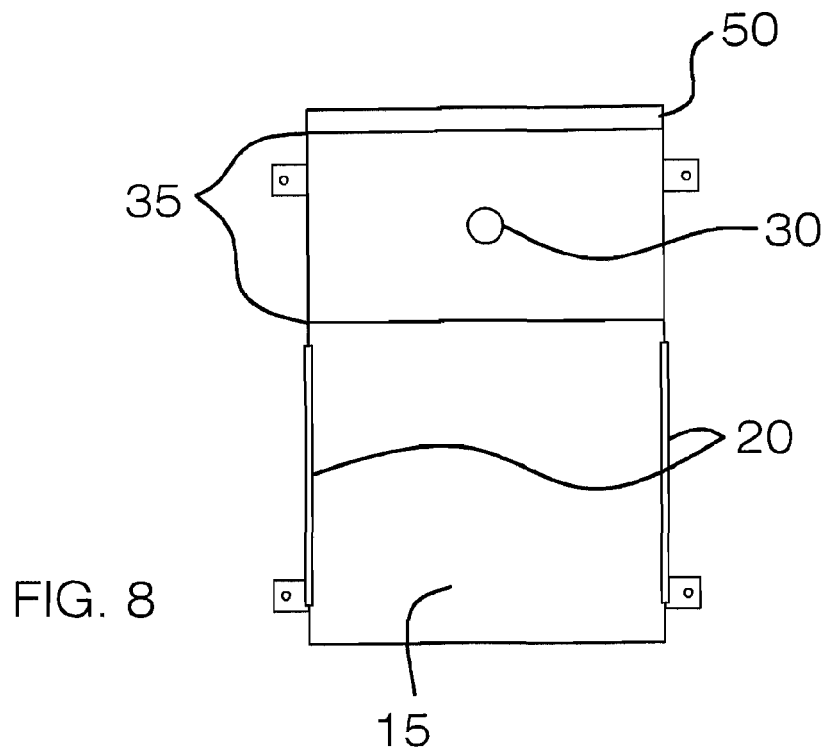
Figure 9:
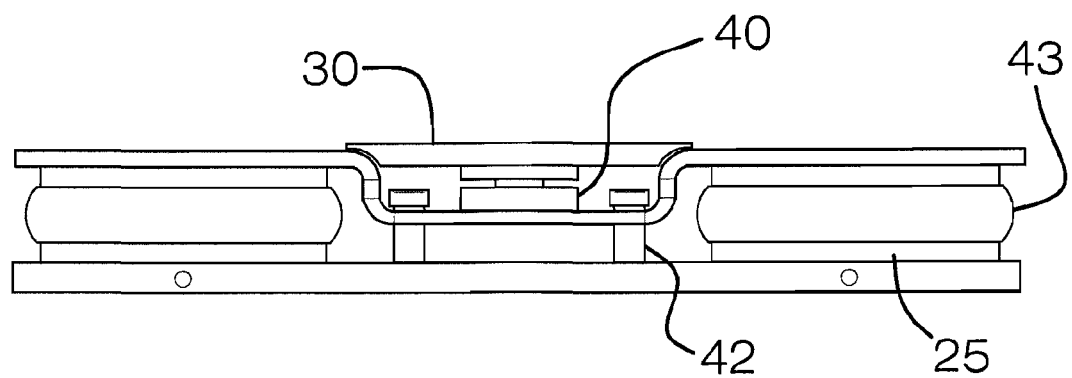
Figure 12:
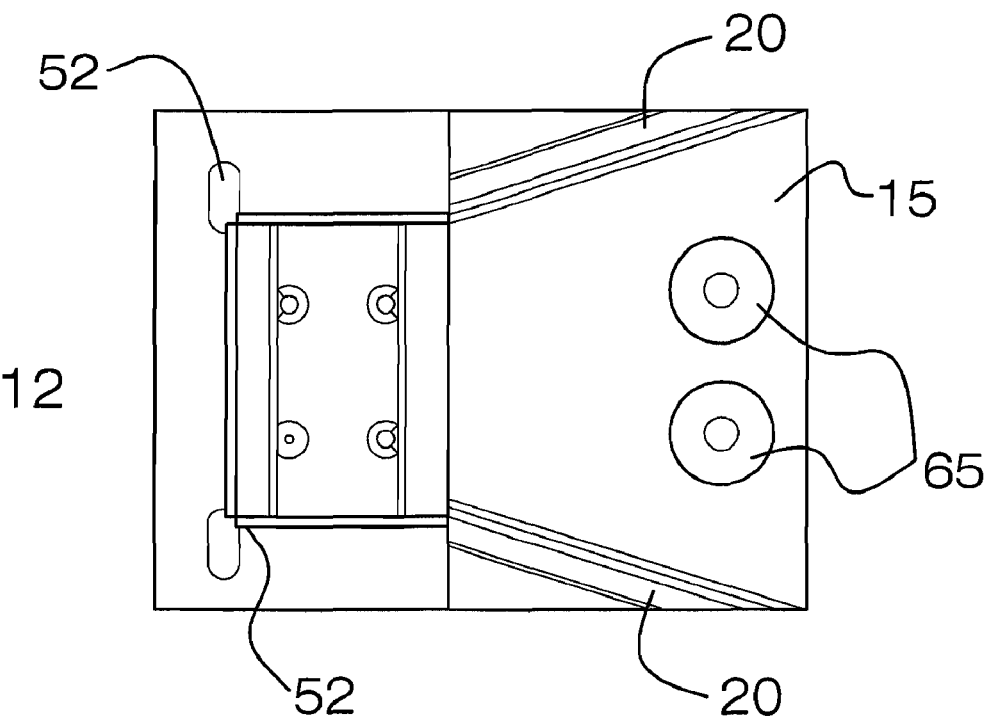
Figure 13:
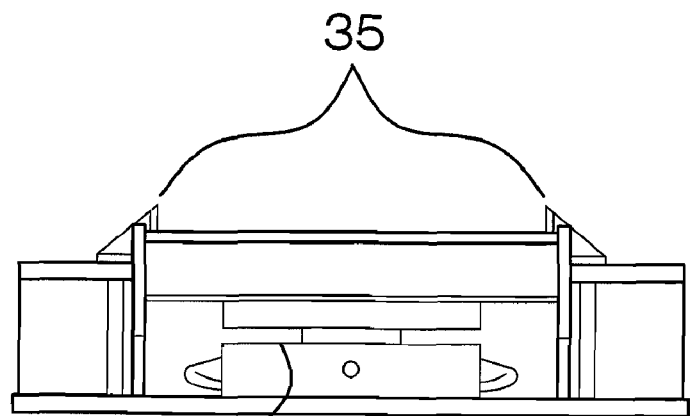
Figure 14:
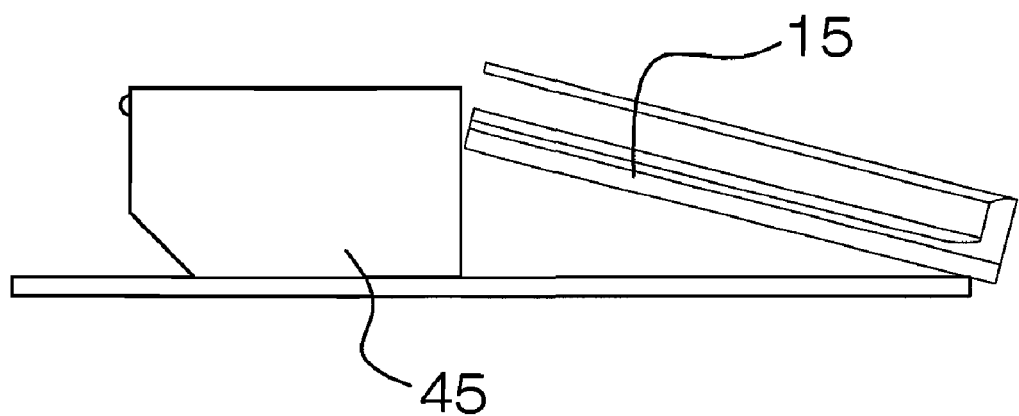
Figure 15:
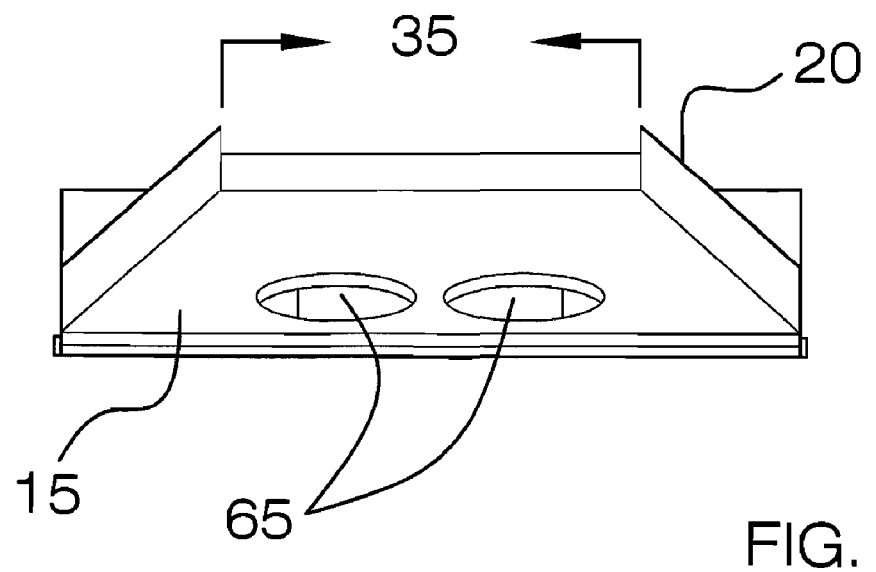
Figure 16:
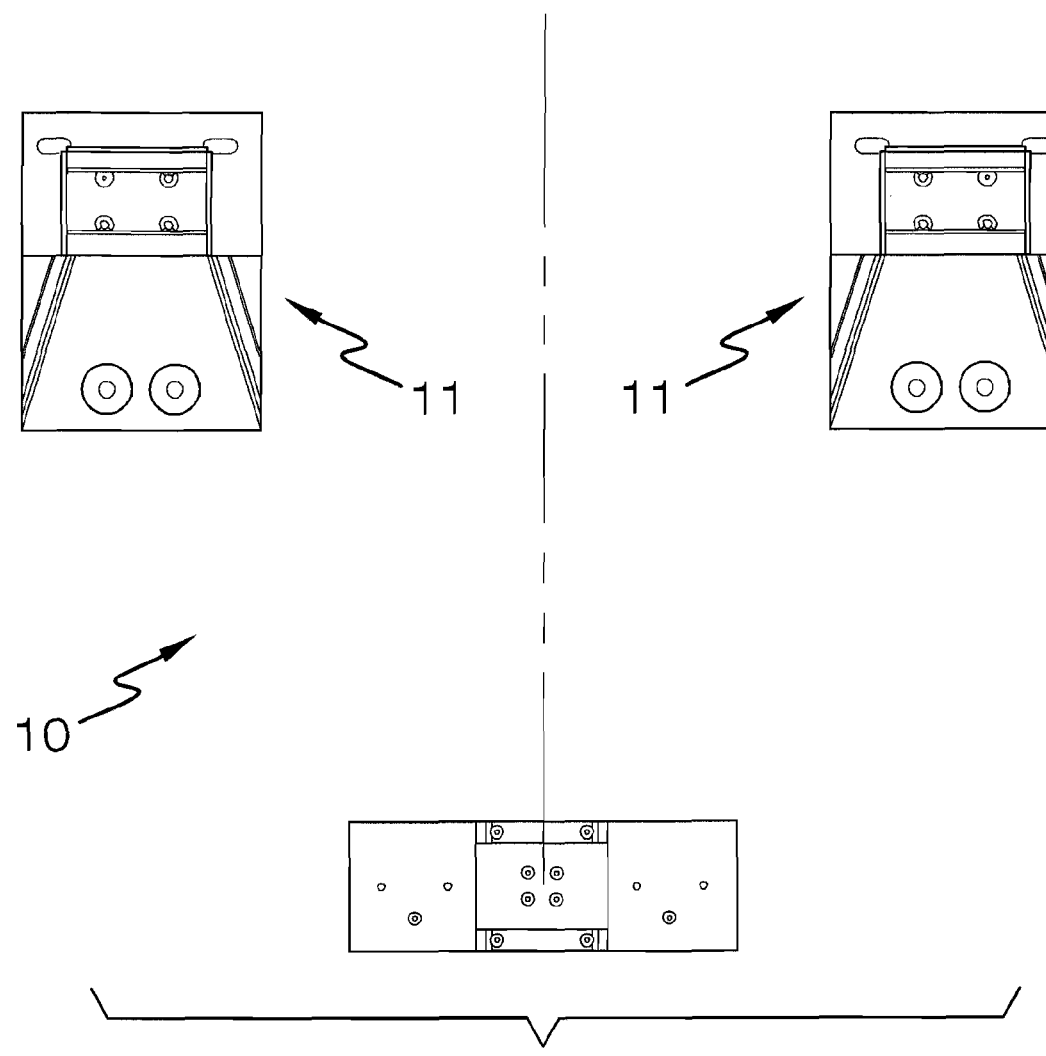
Figure 17:
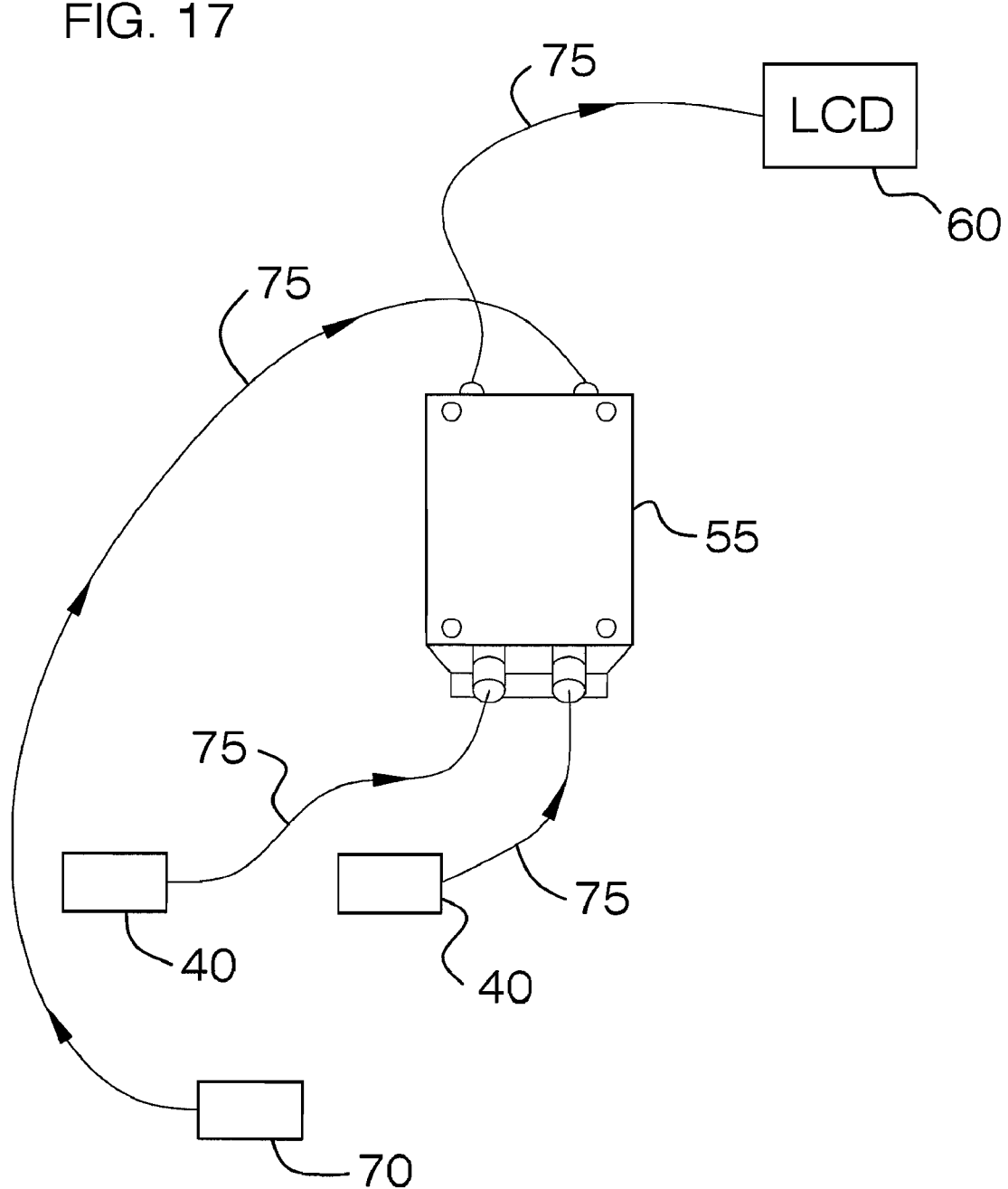
Figure 18:
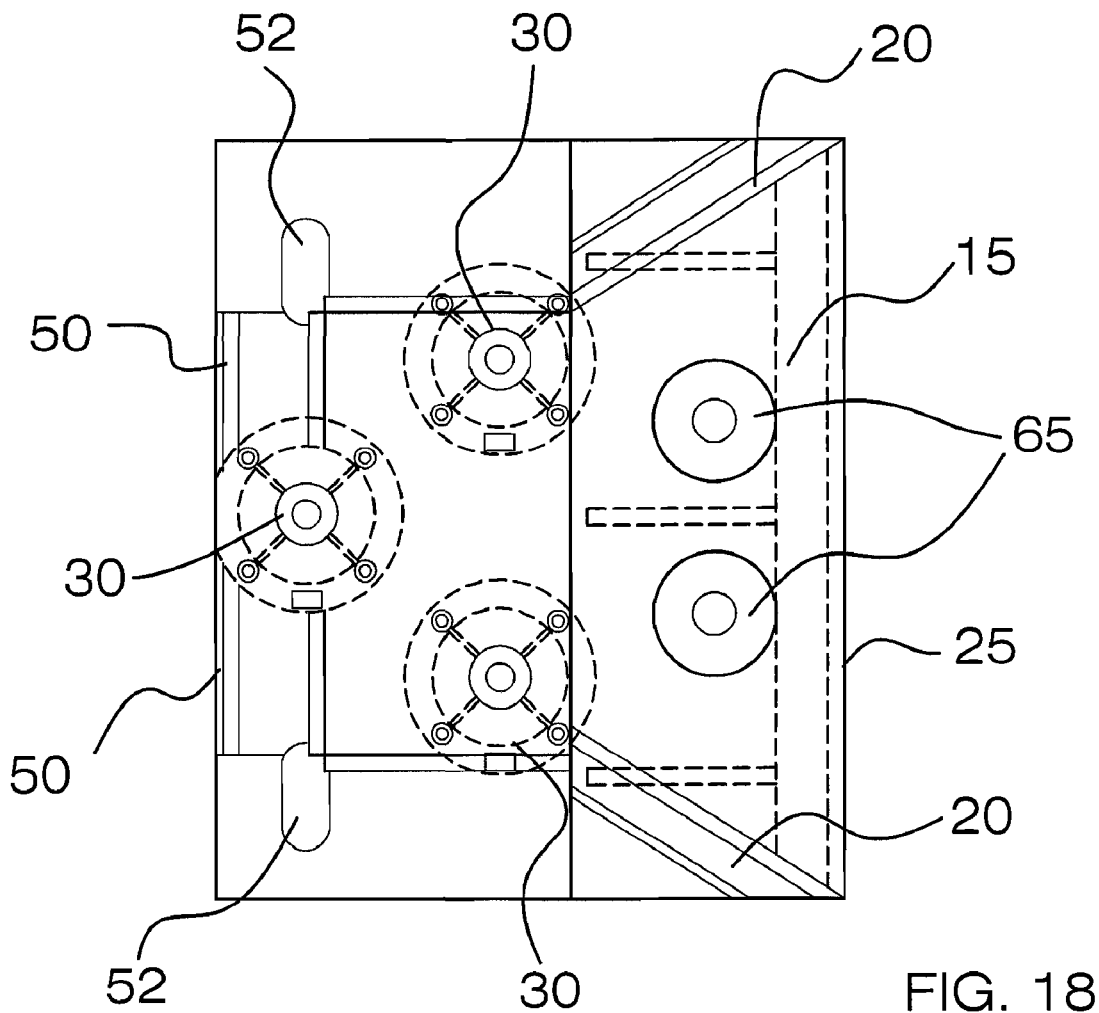
Figure 19:
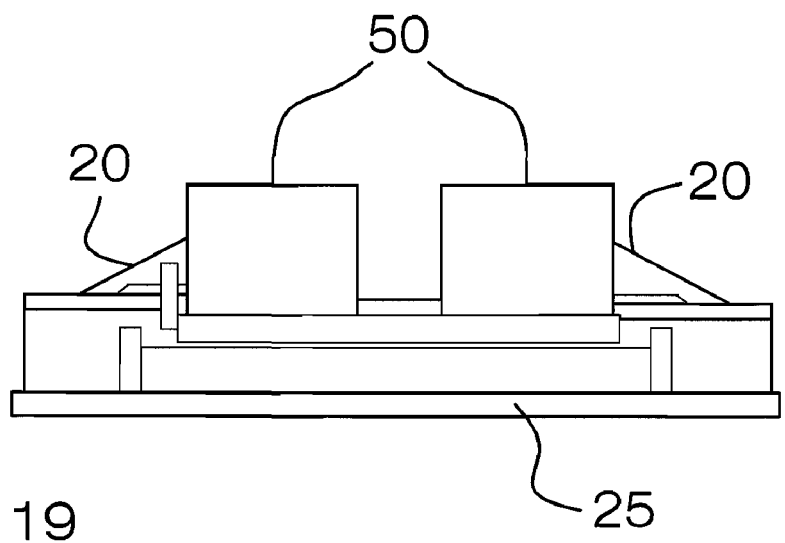
Figure 20:
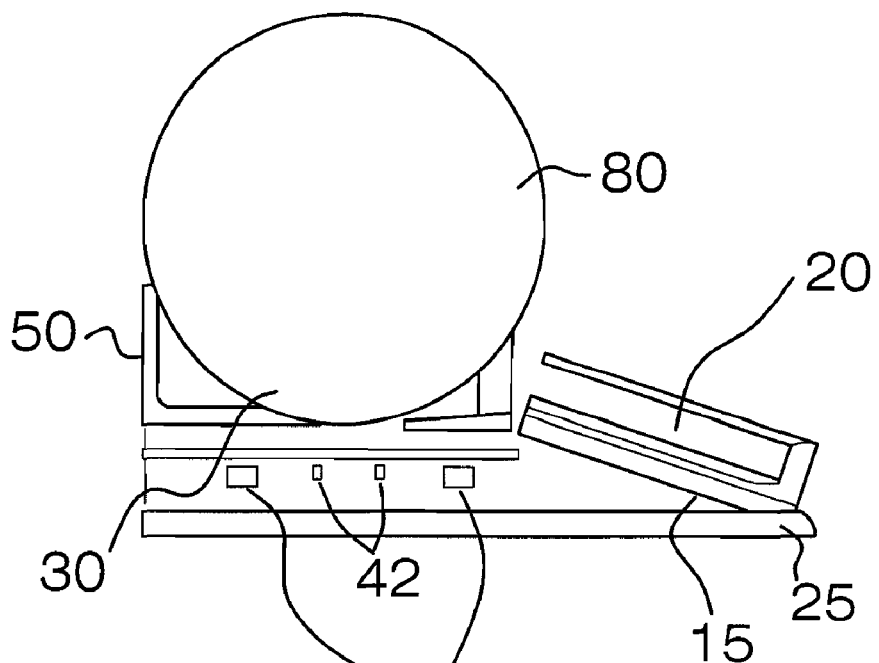
Figure 21:
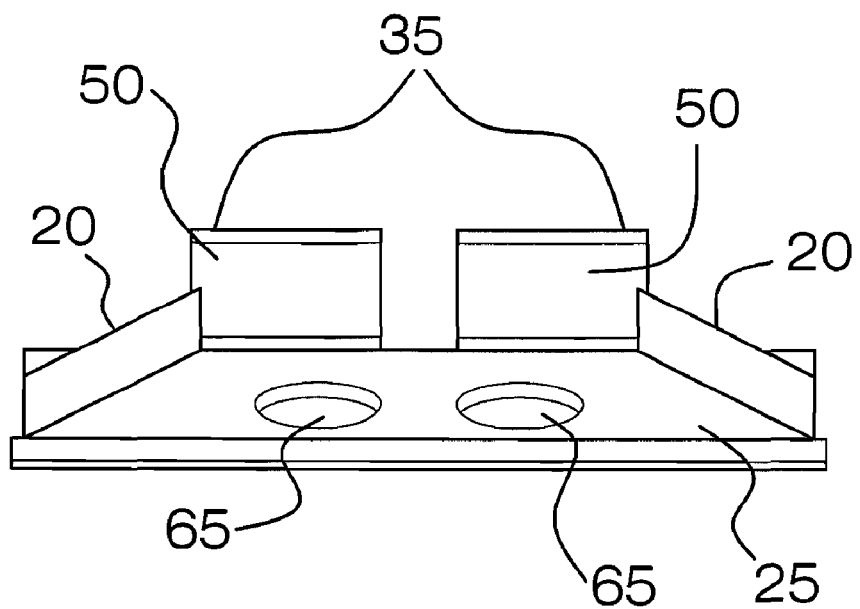

DRAWINGS—FIGURES
FIG. 1—top plan view of the invention
FIG. 2—right elevation view of the invention
FIG. 3—right side isometric view of the invention
FIG. 4—rear elevation view of the invention
FIG. 5—left elevation view of the invention
FIG. 6—cross-sectional side elevation view of the invention
FIG. 7—cross-sectional side elevation view of the invention
FIG. 8—top plan view of the invention
FIG. 9—cross-sectional side elevation view of a load cell illustrated with a non-compressed air bag
FIG. 10—cross-sectional side elevation view of a load cell illustrated with a compressed air bag
FIG. 11—top plan view of a scaling pod
FIG. 12—top plan view of a scaling pod
FIG. 13—cross-sectional view of load cell installed within a wheel gap
FIG. 14—side elevation view of an approach ramp and overload stop
FIG. 15—perspective front view of an approach ramp illustrating guide rails and wheel gap
FIG. 16—top plan schematic view of the invention used as a three-point weighing system with a feed to a telemetry system and to a display device or computer
FIG. 17—perspective view of summing box hard-wired to load cells and compression pad
FIG. 18—top plan view of an alternative embodiment of invention
FIG. 19—rear elevation view of an alternative embodiment of invention
FIG. 20—side elevation view of an alternative embodiment of invention
FIG. 21—front elevation of an alternative embodiment of invention

DRAWINGS—REFERENCE NUMERALS

10—invention
11—scaling pod
15—approach ramp
20—side guard
25—scale base
30—weighing area plate
35—wheel gap
40—load cell
42—check rod
43—air bag
45—overload stop
50—back stop
52—side plate
55—summing box
60—display
65—mounting hole
70—compression pad
75—wiring
80—caster wheel

DETAILED DESCRIPTION OF THE DRAWINGS

With reference now to the drawings and in particular FIGS. 1 through 21 thereof, illustrations employing the principles and concept of the present invention are provided. The invention is generally designated by the reference numeral 10, both as to its organization and method of operation.

FIG. 1 is a top plan view of the invention 10 which generally comprises a wedge-shaped scaling pod 11 (shown in FIG. 1, through FIG. 8) and a display device 60. A scaling pod 10 is comprised of an approach ramp 15 with a side guard 20 on each side. Said approach ramp 15 is mounted to a scale base 25 (shown in FIG. 2 and FIG. 3). Said scaling pod 11 is generally further comprised of a wheel gap 35 (shown in FIG. 3), a weighing area plate 30 (shown in FIG. 6), a shear beam load cell 40 (shown in FIG. 1, FIG. 5, FIG. 6, FIG. 7, FIG. 9, FIG. 10 and FIG. 13), an overload stop 45 (shown in FIG. 6), a back stop 50 (shown in FIG. 1 through FIG. 7), and a summing box 55 (shown in FIG. 17).

Said generally rectangular-shaped scale base 25, approach ramp 15 and side guards 20 are formed of welded steel construction for durability. Load cells 40 are powered by electricity, solar power, or other conventional power sources. Load cells 40 are formed of stainless steel and are hermetically sealed to endure moist environmental conditions. Said summing box 55 is formed of high polish stainless steel for durability in harsh environmental conditions and its compression fittings are formed of watertight nylon. A display device 60, such as an LCD display, is enclosed in stainless steel or otherwise sealed or protected for durability in harsh weather environments. Said summing box 55 and display devices 60 are powered by electricity, solar power, or other conventional power sources.

FIG. 2 shows a right elevation view of a generally wedge-shaped scaling pod 11 comprised of an approach ramp 15, which is an integral part of the scale base 25. FIG. 2 further illustrates a weighing area plate 30 and a generally parallelepiped back stop 50.

FIG. 3 illustrates a right side isometric view of the invention 10. A scaling pod 11 comprised of an approach ramp 15, which is an integral part of the scale base 25, and a back stop 50.

FIG. 4 is a rear elevation view of the invention 10, illustrating a back stop 50.

FIG. 5 is a left elevation view of the invention 10, illustrating a scaling pod 11 comprised, in part, of an approach ramp 15 and back stop 50, which are integral parts of the scale base 25, and a shear beam load cell 40 situated between said approach ramp 15 and back stop 50.

FIG. 6 is a cross-sectional side elevation view of an alternative embodiment of the invention 10. FIG. 6 shows a scale base 25, which includes an approach ramp 15 ending at its uppermost point with a wheel gap 35 between said approach ramp 15 and a weighing area plate 30. FIG. 6 further illustrates that below and connected to said weighing area plate 30 is a shear beam load cell 40 and an overload stop 45.

FIG. 7 provides a detailed cross-sectional side elevation view of the invention 10 as also illustrated in FIGS. 1 through 5 and FIG. 8. FIG. 7 illustrates a generally wedge-shaped scaling pod 11 comprised of an approach ramp 15 with a side guard 20 on each side. A wheel gap 35 is located between the uppermost point of said approach ramp 15 and a weighing area plate 30. The upper side of a shear beam load cell 40 is attached to the lower portion of said weighing area plate 30, while the bottom side of said load cell 40 is attached to the upper side of a parallelepiped overload stop 45. A back stop 50 is separated by said wheel gap 35 from said weighing area plate 30.

FIG. 8 is another top plan view of the invention 10 illustrating an approach ramp 15 with a side guard 20 mounted on each side. FIG. 8 further illustrates the location of a weighing area plate 30 and shows a wheel gap located between the uppermost point of said approach ramp and back stop 50.

FIG. 9 is a cross-sectional side elevation view of a load cell 40 illustrated with a non-compressed air bag 43. FIG. 9 also illustrates two check rod 42 located below a weighing area plate 30 with the distal end of said check rod 42 mounted to scale base 25. Said check rod 42 performs the same function as an overload stop 45 (shown in FIG. 6) in that said check rods 42 protect a load cell 40 (shown in both FIG. 6 and FIG. 9) from being overloaded or crushed by weight in excess of a load cell's capacity.

FIG. 10 is a cross-sectional side elevation view of a load cell 40 illustrated with a compressed air bag 43.

FIG. 11 is a top plan view of a compression pad 70. FIG. 11 illustrates that the present invention can accommodate waste container boxes with various number of wheel casters. While waste container boxes generally have two wheel casters on their back walls and guide rails in their centers, the present invention can accommodate various wheel caster arrangements. FIG. 11 shows a compression pad 70 upon which guide rails of a waste container box would rest, while two wheel casters each rest on two scaling pods 11, the configuration of which is referred to as a three-point waste scaling system and is illustrated in FIG. 16.

FIG. 12 is a top plan view of a scaling pod 11 illustrating side guards 20 on each side of an approach ramp 15. While a scaling pod 11 is portable, a scaling pod may be permanently affixed to a concrete or like pad. FIG. 12 shows a plurality of mounting hole 65 by which a scaling pod 11 may be permanently affixed to a concrete or like pad. A side plate 52 is located on each side of a weighing area plate to captivate container box caster wheels 80 in proper position for weighing.

FIG. 13 is a cross-sectional view of load cell 40 installed beneath a wheel gap 35.

FIG. 14 is a side elevation view of an approach ramp 15 and overload stop 45.

FIG. 15 is perspective front view of an approach ramp 15 illustrating guide rails 20 and wheel gap 35. While a scaling pod is portable, a scaling pod 11 may be permanently affixed to a concrete or like pad. FIG. 15 shows a plurality of mounting hole 65 by which a scaling pod 11 may be permanently affixed to a concrete or like pad.

FIG. 16 is a top plan schematic view of the invention 10 used as a three-point waste scaling system. The three-point waste scaling system employs two scaling pods 11 upon which two back wheel casters of a waste container box rest and a compression pad 70 upon which a guide rail of a waste container box rests. Weight measured by each of such scaling pods 11 and compression pad 70 (also illustrated in FIG. 11) is sent via wiring 75 (shown in FIG. 17) to a summing box 55 (shown in FIG. 17). Said summing box 55 combines or adds together weight measured by scaling pod 11 and compression pad 70 to provide a total or aggregate weight of said waste container box.

FIG. 17 is a perspective view of a summing box 55 connected via wiring 75 to each load cell 40 and compression pad 70. FIG. 17 illustrates a three-point weighing system as described by FIG. 16 hereinabove.

FIG. 18 is a top plan view of an alternative embodiment of invention illustrating three scaling pods 30 located in a triangular pattern on a scale base 25. Mounting holes 65 are provided in said scale base 25 on the opposite end from said scaling pods 30. Said scale base 25 may be permanently affixed to a concrete pad or other foundation by driving rods or the like through said mounting holes 65. FIG. 18 also illustrates side guards 29 on each side of said approach ramp 15. Side plates located on each side of said scaling pod 30 closest to said back stops 50 captivate waste container box caster wheels to ensure proper placement of a waste container box on the invention.

FIG. 19 is a rear elevation view of the alternative embodiment of invention 10 as illustrated in FIG. 18 hereinabove. FIG. 19 illustrates back stops 50 located at the rear, uppermost point of said scale base 25 and are affixed to said scale base 25 in such a manner as to extend upwardly. Side guards 20 prevent a waste container box from rolling off the side of a scaling pod 11, while back stops 50 prevent a waste container box from rolling off the back of a scaling pod.

FIG. 20 is a side elevation view of the alternative embodiment as illustrated in FIG. 18 hereinabove. FIG. 20 illustrates an approach ramp 15 affixed to one end of said scale base 25 with a side rail 20 located on each side of said approach ramp 15. FIG. 20 further illustrates a caster wheel 80 (not part of the invention) seated on top of a weighing area plate 30 and against a back stop 50. FIG. 20 also shows load cells 40 and check rods 42 located beneath said weighing area plate 30.

FIG. 21 is a front elevation of the alternative embodiment as illustrated in FIG. 18 hereinabove. FIG. 21 shows mounting holes 65 centered in the front of a scale base 25 and side guards 20 on each side of said scale base 25. FIG. 21 further illustrates back stops 50 located on the rear of said scale base 25. A wheel gap 35 is of a size so as to accommodate a container box caster wheel 80 (shown in FIG. 20).

With respect to the above description then, it is to be realized that the optimum dimensional relationships for the parts of the present automated waste scaling system includes variations in size, materials, shape, form, function, and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

OPERATION

To use the present automated waste scaling system, a truck backs onto an approach ramp 15 (shown in FIGS. 3 and 7) to lower each corner of a waste container box onto a scaling pod 11, either permanently mounted or removably affixed to a concrete pad or similar foundation, such that each corner comes to rest within a wheel gap 35 (shown in FIG. 7) and onto a weighing area plate 30 (shown in FIG. 7). The aggregate or total weight of said waste container box is calculated by taking the weight measured by each load cell 40 (shown in FIG. 7) and sending said weight measurement to a summing box 55 (shown in FIG. 17). The aggregate weight is then sent to a display device 60 (not shown), such as an LCD display, or to a printer, computer, or other electronic or digital device, such devices being connected to said summing box 55 (shown in FIG. 17) either by direct wiring or wireless technology, such as WI-FI technology. An overload stop 45 (shown in FIG. 6) protects each shear beam load cell 40 (shown in FIG. 6) from being overloaded or crushed by weight in excess of a load cell's capacity. A back stop 50 (shown in FIG. 3) prevents caster wheels 80 from backing off the rear of a scaling pod 11.

In a three-point waste scaling system (shown in FIG. 16), a waste container box is placed such that two rear wheel casters of such waste container box rest on scaling pods 11 (shown in FIG. 16) while a guide rail of such waste container box rests on a compression pad 70 (shown in FIG. 16). Weight is measured by each load cell located within each scaling pod 11 and by said compression pad 70 (shown in FIG. 11 and FIG. 16) and is sent to a summing box 55 (shown in FIG. 17) to obtain an aggregate weight measurement of such container box.

What is claimed is:

1. An automated waste scaling system comprising:
    a generally wedge-shaped scaling pod further comprised of a rectangular shaped scale base to which a generally wedge-shaped approach ramp is welded; said approach ramp having a side guard on each side; a wheel gap located between an uppermost point of said approach ramp and a back stop, located such that a caster wheel is prevented from rolling off of the rear of said scaling pod; a concave weighing area plate centrally located within said wheel gap; at least two shear beam load cells located between said weighing area plate and said scale base; a compression pad; an overload stop or check rod, located below said load cell to prevent load cell from being crushed by excess weight; and a summing box to calculate aggregate load weight by adding together a weight measurement from each said load cell and compression pad, said summing box in operational communication with said compression pad; and
    a display device;
wherein said load cell is capable of weighing a load capacity of up to twenty thousand pounds (20,000 lbs.).

2. The automated waste scaling system in claim 1 wherein said load cell is sealed so as to endure moist environmental conditions.

* * * * *